United States Patent
Zhou et al.

(10) Patent No.: US 10,252,347 B2
(45) Date of Patent: Apr. 9, 2019

(54) SELF-LOCKING DRILL CHUCK

(71) Applicant: ZHEJIANG SANOU MACHINERY CO. LTD., Zhejiang (CN)

(72) Inventors: Wenhua Zhou, Zhejiang (CN); Qirong Lu, Zhejiang (CN)

(73) Assignee: ZHEJIANG SANOU MACHINERY CO. LTD., Zhejiang (CN)

( * ) Notice: Subject to any disclaimer, the term of this patent is extended or adjusted under 35 U.S.C. 154(b) by 19 days.

(21) Appl. No.: 15/593,668

(22) Filed: May 12, 2017

(65) Prior Publication Data

US 2017/0334000 A1 Nov. 23, 2017

(30) Foreign Application Priority Data

May 20, 2016 (CN) ..................... 2016 2 0467145 U

(51) Int. Cl.
*B23B 31/12* (2006.01)

(52) U.S. Cl.
CPC ........ *B23B 31/123* (2013.01); *B23B 31/1238* (2013.01); *B23B 2260/114* (2013.01); *Y10T 279/17632* (2015.01); *Y10T 279/32* (2015.01)

(58) Field of Classification Search
CPC ............... B23B 31/123; B23B 31/1238; Y10T 279/17615; Y10T 279/17623; Y10T 279/17632
See application file for complete search history.

(56) References Cited

U.S. PATENT DOCUMENTS

| 5,431,419 | A | * | 7/1995 | Mack | .................... | B23B 31/123 |
| | | | | | | 279/140 |
| 8,141,883 | B2 | * | 3/2012 | Hu | ........................ | B23B 31/123 |
| | | | | | | 279/140 |
| 8,616,561 | B2 | * | 12/2013 | Mason | .................. | B23B 31/123 |
| | | | | | | 279/140 |
| 2017/0252832 | A1 | * | 9/2017 | Zhou | ..................... | B23B 31/123 |

FOREIGN PATENT DOCUMENTS

| CN | 201012397 Y | * | 1/2008 | |
| CN | 201815693 U | * | 5/2011 | |
| DE | 2806797 A | * | 8/1979 | |
| DE | 19710565 C1 | * | 6/1998 | .......... B23B 31/123 |
| DE | 19832891 A1 | * | 2/2000 | .......... B23B 31/123 |
| JP | 03136706 A | * | 6/1991 | ......... B23B 31/1238 |
| WO | WO 2017051232 A1 | * | 3/2017 | .......... B23B 31/123 |

* cited by examiner

*Primary Examiner* — Eric A Gates
(74) *Attorney, Agent, or Firm* — Muncy, Geissler, Olds & Lowe, PC

(57) ABSTRACT

A self-locking drill chuck includes rotating sleeve provided with a convex leaf spring fixed on a rotating sleeve on both ends, its nut or the ring fixedly connected with the nut provided with a first groove and a second groove matching with the convex portion of the convex leaf spring, and the self-locking structure including a ring tooth on the drill body and a rotatable locking block disposed on the nut or ring fixedly connected to the nut. The nut or ring fixedly connected to the nut is also provided with a leaf spring, and the rotating sleeve is provided with a first part compressing the leaf spring and a second part compressing the locking block. The self-locking drill chuck can achieve positioning fit of metals, and self-locking and unlocking switching is realized by the lever without the interference phenomenon in the self-locking structure.

6 Claims, 4 Drawing Sheets

SELF-LOCKING DRILL CHUCK

FIELD OF THE INVENTION

The present invention relates to a self-locking drill chuck.

BACKGROUND

In the prior art, the drill chuck is provided with a drill body, a clamping jaw, a nut, and by rotating the nut to move the clamping jaw forward or backward, the drilling tool is clamped or loosened by the drill chuck. The self-locking structure in the drill chuck is designed to prevent the drill chuck from being dislodged by the reaction force applied during operation. Usually the parts with leaf spring are coordinated with the teeth on the drill body. Under a high-speed rotation state, this kind of drill chucks may fail due to the action of centrifugal force.

SUMMARY

The object of the present invention is to provide a self-locking drill chuck, which can reliably maintain self-locking state when working. To this end, the invention adopts the following technical solutions:

A self-locking drill chuck, including a drill body, a nut, a clamping jaw, a self-locking structure, and a rotating sleeve, wherein the self-locking structure includes a ring tooth and a locking piece, the locking piece has a locking end engaged with the tooth, the locking piece is arranged at the part rotating with the nut, the ring tooth is arranged on the drill body or a part rotating with the drill body, the tooth face of the ring tooth is directed toward the front of the drill chuck, the rotating sleeve is connected with a part for driving the locking piece to allow the locking end of the locking piece to be inserted into the tooth of the ring tooth.

Further, the ring tooth is arranged on the end face of the first ring, the first ring is nested outside of the drill body, having interference fit with the drill body and being supported on the step of the drill body.

Further, the locking piece is a cantilever disposed on the second ring nested outside of the drill body, the second ring rotates with the nut, the second ring has a cantilever base portion in front of the tooth face of the ring tooth, and the cantilever extends to the circumferential direction of the cantilever base portion.

Further, a nut sleeve is fixedly connected outside of the nut and the second ring is disposed at the front of the nut sleeve by a keyway.

Further, the part that drives the locking piece to insert the locking end into the tooth of the ring tooth is a third ring, encompassing the drill body and in the front of the first ring, the cantilever has a forward protrusion, the third ring has a ring face matching with the front protrusion, to compress the cantilever and insert the locking end into the tooth of the ring tooth, the second ring has a run-out groove matching with the protrusion, so that the locking end can be reset to disengage the tooth.

Further, the part that drives the locking piece to insert the locking end into the tooth of the ring tooth is a third ring, encompassing the drill body and in the front of the first ring, the cantilever has a forward protrusion, the third ring has a ring face matching with the front protrusion, to compress the cantilever and insert the locking end into the tooth of the ring tooth, the second ring has a run-out groove matching with the protrusion, so that the locking end can be reset to disengage the tooth, and the ring face of the third ring can limit the second ring at the front of the second ring.

Further, the part that drives the locking piece to insert the locking end into the tooth of the ring tooth is matched and connected to the rotating sleeve by means of a keyway.

Further, the nut is fixedly secured to the nut sleeve, the second ring is disposed in front of the nut sleeve by a keyway fit, and the nut sleeve is provided with a groove matching with the keyway, the length of groove is corresponding to the angle of rotating sleeve rotating relative to the nut when the drill chuck is from self-locking state to self-locking state, and the rotating sleeve is provided with a key engaged with the groove.

By adopting the technical solutions in the invention, this kind of new self-locking drill chuck can avoid the influence of the centrifugal force on the self-locking structure, so as to improve the operating stability of the self-locking structure.

DETAILED DESCRIPTION

Figure 1:
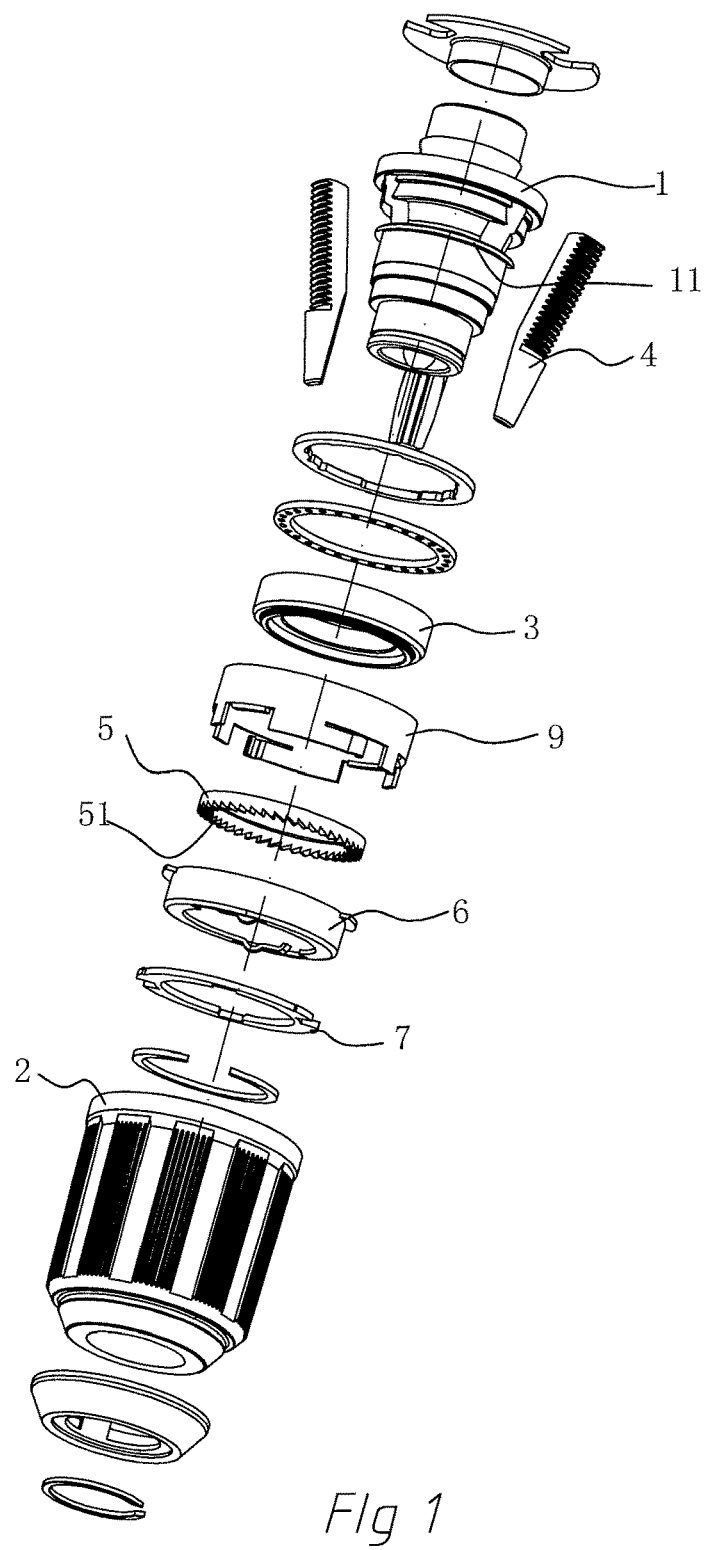
FIG. 1 is an exploded view according to an embodiment of the present invention.
Figure 2:
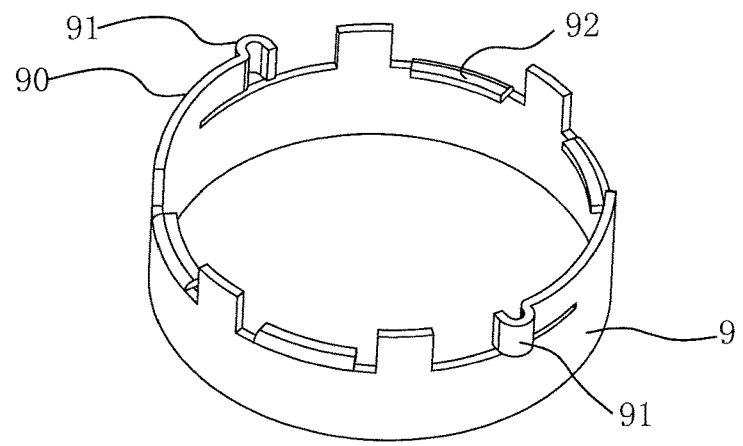
FIG. 2 is an enlarged schematic view of the nut sleeve in FIG. 1.
Figure 3:
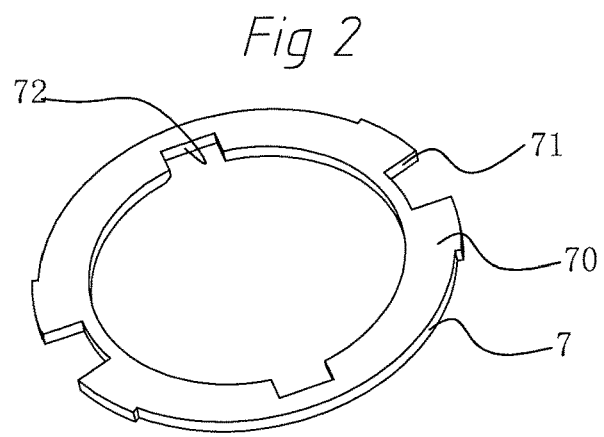
FIG. 3 is an enlarged view of a third ring in FIG. 1.
Figure 4:
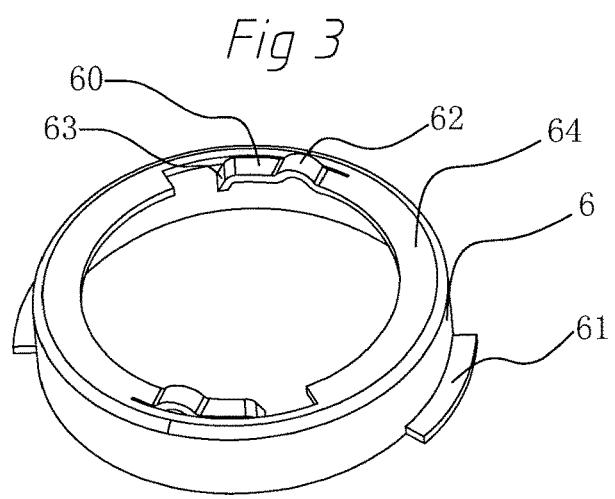
FIG. 4 is an enlarged view of a second ring in FIG. 1.
Figure 5:
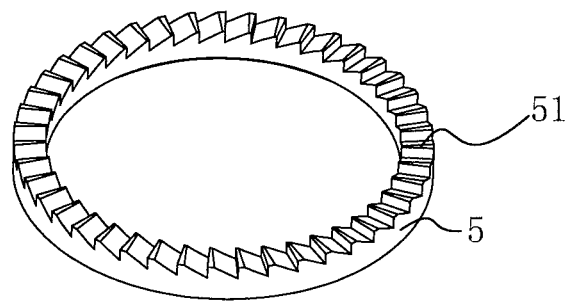
FIG. 5 is an enlarged view of a first ring in FIG. 1.
Figure 6:
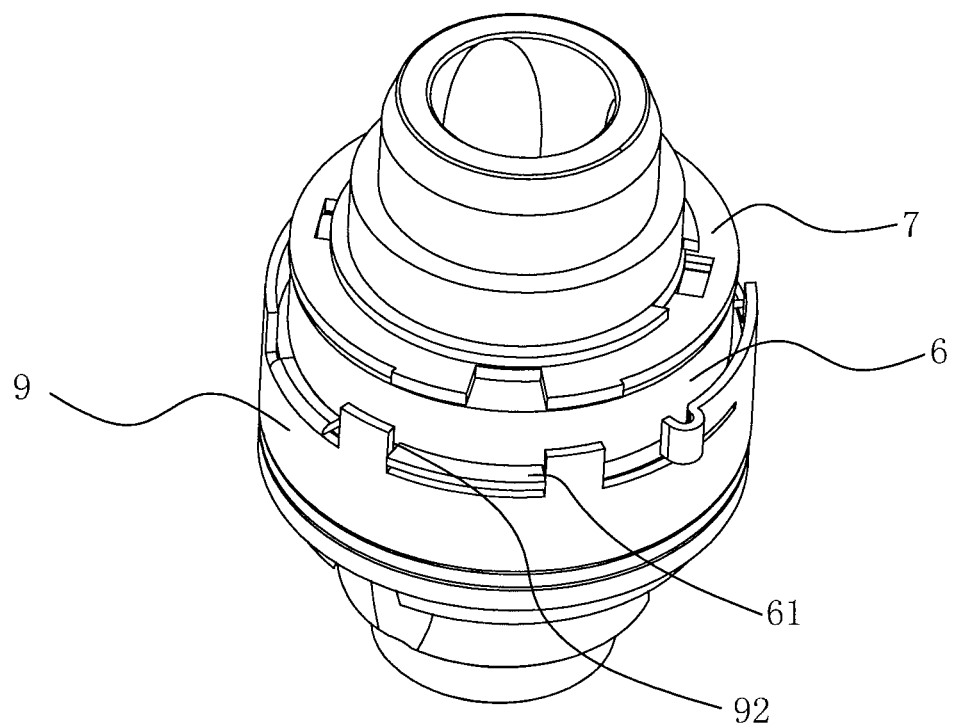
FIG. 6 is a combined schematic diagram of a drill body with self-locking structure according to an embodiment in FIG. 1.
Figure 7:
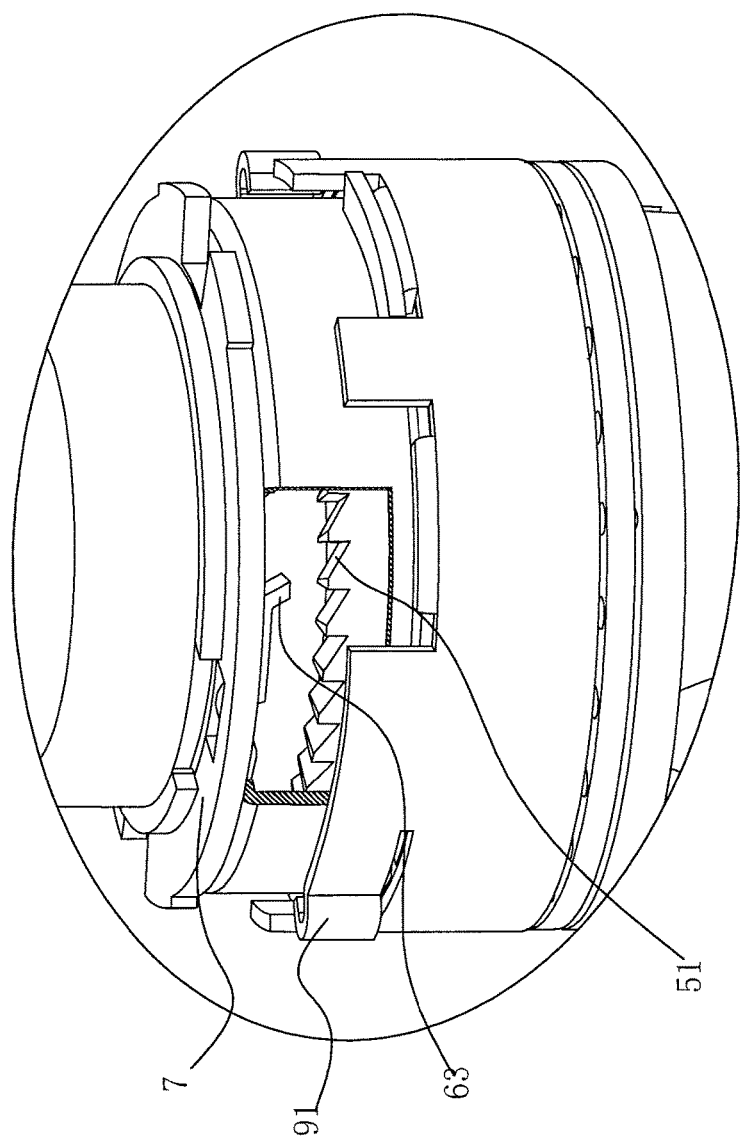
FIG. 7 is a schematic view of matching of a self-locking structure according to an embodiment in FIG. 1.

Referring to the figure, a self-locking drill chuck provided in the invention, including a drill body 1, a nut 3, a clamping jaw 4, a self-locking structure, and a rotating sleeve 2, wherein the self-locking structure includes a ring tooth 51 and a locking piece 60, the locking piece 60 has a locking end 63 engaged with the tooth 51, the locking piece 60 is arranged at the part rotating with the nut 3, the ring tooth 51 is arranged on the drill body 1 or a part rotating with the drill body 1. As shown in FIGS. 1 and 7, the tooth face of the ring tooth 51 is directed toward the front of the drill chuck, the rotating sleeve 2 is connected with a part for driving the locking piece 60 to allow the locking end 63 of the locking piece to be inserted into the tooth of the ring tooth.

The ring tooth 51 is arranged on the end face of the first ring 5, the first ring 5 is nested outside of the drill body 1, having interference fit with the drill body and being supported on the step 11 of the drill body.

The locking piece 60 is a cantilever disposed on the second ring 6 nested outside of the drill body, which can be a leaf spring, the second ring 6 rotates with the nut 3, the second ring 6 has a cantilever base portion 64 in front of the tooth face of the ring tooth, and the cantilever extends to the circumferential direction of the cantilever base portion 64.

The nut 3 is fixedly connected with the nut sleeve 9 externally, the nut sleeve 9 is sleeved outside of the nut 3 with interference fit, and the two nut halves are combined to form a complete nut 3. The second ring 6 is disposed at the front of the nut sleeve 9 by a keyway. The figure code 92 represents a groove for keyway engagement on the nut sleeve 9, the figure code 61 represents a key for keyway engagement on the second ring 6. The length of groove 92 is corresponding to the angle of rotating sleeve 2 rotating relative to the nut 3 when the drill chuck is from self-locking state to self-locking state, and the rotating sleeve is provided with a key engaged with the groove 92, to achieve "one groove for two purposes" of the groove 92. A cantilever 90 is provided on the nut sleeve 9, and the cantilever 90 is provided with two protrusions 91 corresponding to the self-locking state and non-self-locking state on the inner wall of the rotating sleeve respectively, so that the rotating sleeve 2 maintains the position and connects with the nut sleeve 9 at the two states. The matching between the key on the rotating sleeve and the groove 92 on the nut sleeve 9 can enable the rotating sleeve 2 to rotate the nut 3 in the forward direction when the drill chuck enters a self-locking state, and rotate the nut 3 in the reverse direction when the drill chuck converts from the self-locking state to the non-self-locking state.

The part that drives the locking piece 60 to insert the locking end 63 into the tooth of the ring tooth 51 is a third ring 7, encompassing the drill body 1 and in the front of the first ring 5, the locking piece 60 has a forward protrusion 62, the third ring 7 has a ring face 70 matching with the front protrusion 62, to compress the cantilever and insert the locking end 63 into the tooth of the ring tooth 51, the third ring 7 has a run-out groove 72 matching with the protrusion 62, so that the locking end 63 can be reset to disengage the tooth, and the ring face 70 of the third ring 7 can limit the second ring 6 at the front of the second ring 6.

The third ring 7 is connected to the rotating sleeve 2 through a keyway. The figure code 71 is a groove for engaging the keyway, and a corresponding key is provided on the inner wall of the rotating sleeve 2.

The above description is only specific embodiments of the invention, but it is not limited to these structural features. Any changes or modifications made by those skilled in the art within the scope of the present invention will fall into the scope of protection in the invention.

The invention claimed is:

1. A self-locking drill chuck, comprising a drill body, a nut, a clamping jaw, a self-locking structure, a first ring, and a rotating sleeve, wherein the self-locking structure comprises a ring tooth and a locking piece, the locking piece has a locking end engaged with the tooth, the locking piece is arranged at a part rotating with the nut, the ring tooth is arranged on the drill body or a part rotating with the drill body, a tooth face of the ring tooth is directed toward the front of the drill chuck, the rotating sleeve is connected with a part for driving the locking piece to allow the locking end of the locking piece to be inserted into a tooth of the ring tooth, wherein the locking piece is a cantilever disposed on a second ring nested outside of the drill body, the second ring rotates with the nut, the second ring has a cantilever base portion in front of the tooth face of the ring tooth, and the cantilever extends to the circumferential direction of the cantilever base portion, and wherein the nut is fixedly secured to a nut sleeve, the second ring is disposed in front of the nut sleeve by a keyway fit, and the nut sleeve is provided with a groove matching with the keyway, the length of groove is corresponding to the angle of rotating sleeve rotating relative to the nut when the drill chuck is from self-locking state to self-locking state, and the rotating sleeve is provided with a key engaged with the groove.

2. The new self-locking drill chuck according to claim 1, wherein the ring tooth is arranged on the end face of the first ring, the first ring is nested outside of the drill body, having interference fit with the drill body and being supported on a step of the drill body.

3. The new self-locking drill chuck according to claim 1, wherein the nut sleeve is fixedly connected outside of the nut and the second ring is disposed at the front of the nut sleeve by a keyway.

4. The new self-locking drill chuck according to claim 3, wherein the part that drives the locking piece to insert the locking end into the tooth of the ring tooth is a third ring, encompassing the drill body and in the front of the first ring, the cantilever has a forward protrusion, the third ring has a ring face matching with the forward protrusion, to compress the cantilever and insert the locking end into the tooth of the ring tooth, the third ring has a run-out groove matching with the protrusion, so that the locking end can be reset to disengage the tooth, and the ring face of the third ring can limit the second ring at the front of the second ring.

5. The new self-locking drill chuck according to claim 1, wherein the part that drives the locking piece to insert the locking end into the tooth of the ring tooth is a third ring, encompassing the drill body and in the front of the first ring, the cantilever has a forward protrusion, the third ring has a ring face matching with the forward protrusion, to compress the cantilever and insert the locking end into the tooth of the ring tooth, the third ring has a run-out groove matching with the protrusion, so that the locking end can be reset to disengage the tooth.

6. The new self-locking drill chuck according to claim 1, wherein the part that drives the locking piece to insert the locking end into the tooth of the ring tooth is matched and connected to the rotating sleeve by means of a keyway.

\* \* \* \* \*